Patented Aug. 22, 1944

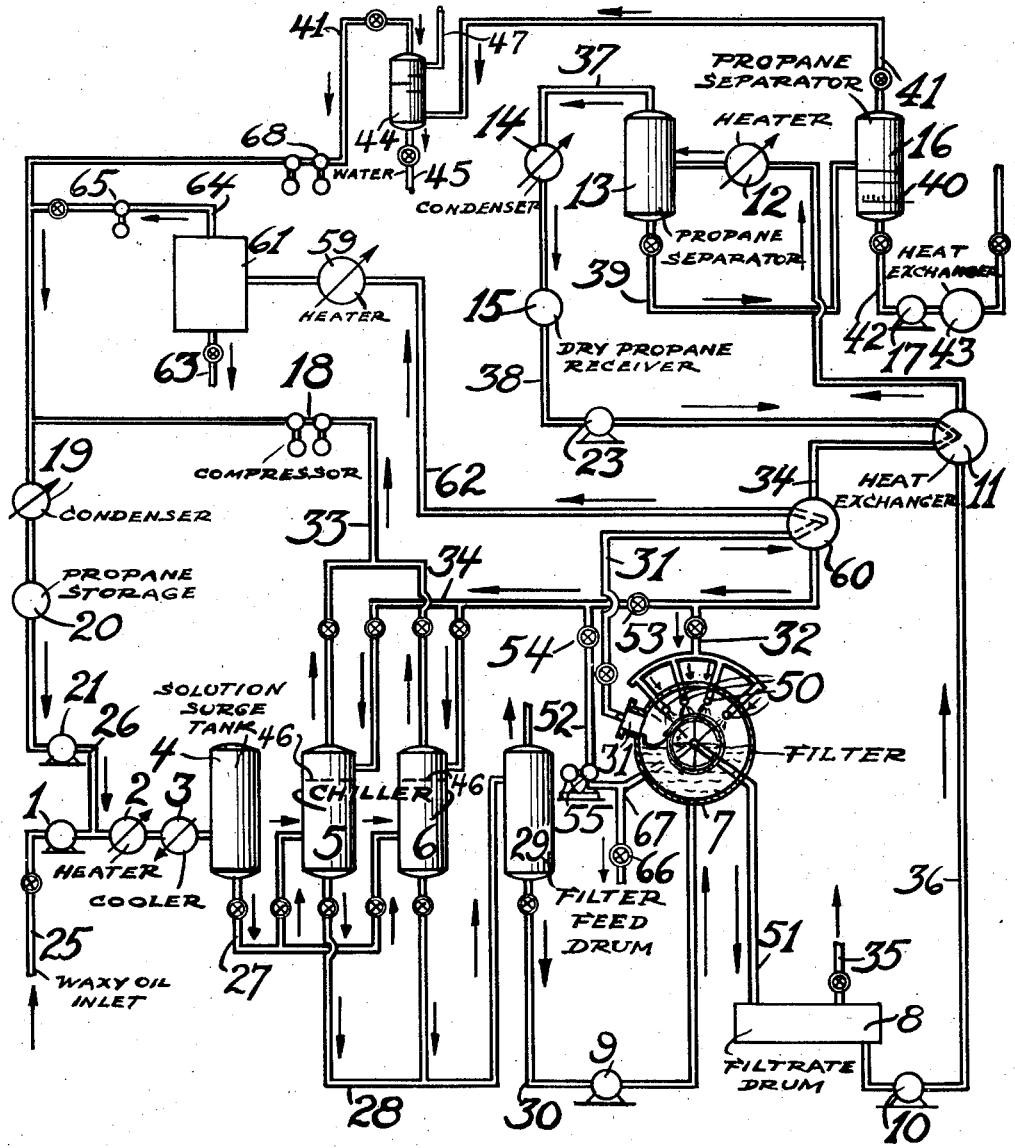

2,356,346

UNITED STATES PATENT OFFICE 2,356,346

DEWAXING PROCESS

John W. Packie, Green Village, John D. Long, Westfield, and Paul W. Cornell, Elizabeth, N. J., assignors to Standard Oil Development Company, a corporation of Delaware Application April 9, 1940, Serial No. 328,620

11 Claims. (Cl. 196—18)

The present invention relates to an improved method for the removal of waxy constituents from wax-bearing mineral oils. In accordance with the present process, the wax-bearing oil is diluted with a suitable solvent or diluent and chilled to dewaxing temperatures by vaporization of the solvent. The ratio of solvent to oil is maintained at the desired value by the addition of substantially anhydrous make-up recycled solvent which has been chilled to the desired extent by heat exchange with the cold dewaxed oil. The chilled mass containing precipitated waxy constituents is then handled in a manner to separate the waxy constituents which is preferably accomplished by means of a rotary type filter. The wax cake on the rotary filter is washed with chilled anhydrous solvent by suitable distributing and spraying means. The anhydrous make-up solvent and the anhydrous solvent used for washing the wax cake are segregated from a stage of the solvent recovery plant. Preferred modifications of the present invention are to utilize segregated wash solvent as make-up solvent in the chillers and to control the addition of make-up solvent so as to secure a progressively decreasing liquid level in the chillers as the temperature of the waxy mixture decreases.

It is well known in the art to remove waxy constituents from wax-bearing oils, particularly from wax-containing petroleum oils, by various methods. These processes generally all chill the wax-bearing oil to a temperature at which the waxy constituents precipitate. The chilled mixture is then handled in a manner to separate the precipitated waxy constituents from the dewaxed oil by various means, usually by sedimentation, filtering, centrifuging and the like. A desirable procedure is to employ so-called dewaxing solvents, as for example, liquefied normally gaseous hydrocarbons, such as liquid propane. When employing propane or an equivalent solvent, the usual procedure is to add a sufficient quantity of solvent to dissolve the oil and the waxy constituents. Complete miscibility of the mixture is usually secured by heating the same to an elevated temperature. Temperature and pressure conditions are adjusted to vaporize a portion of the solvent in order to cool the mixture to a temperature at which the waxy constituents precipitate. In order to secure wax crystals of desirable structure which may be readily removed by filtration, it is necessary to control the cooling rate as well as the ratio of oil to solvent. The ratio of oil to solvent may be regulated by adding so-called make-up solvent which preferably has been previously chilled to a temperature corresponding to the temperature of the chilled mass by vaporization of a portion of the solvent. This method of chilling is not entirely satisfactory since a distinct refrigeration loss occurs. In order to overcome this, suggestions have been made that the make-up solvent be chilled to the desired temperature by heat exchange with the chilled dewaxed oil. This operation, however, is difficult to employ commercially due to the fact that heat exchange between the respective streams is not readily secured. Ice plugging occurs in the heat exchanging equipment, materially reducing heat exchanging rates and prohibitively raising the cost of the operation. Also, in order to secure the best dewaxing results, it is necessary that the wax cake be sprayed with additional chilled solvent. This is most efficiently accomplished by means of spray type nozzles although troughs and similar means are satisfactory. Spraying and washing operations of this character have been considerably impaired due to ice plugging of the nozzles and similar spraying and washing means, thus materially decreasing the efficiency of the entire dewaxing operation as well as the quality of the wax and the yield of the dewaxed oil.

We have now discovered a process for the removal of the waxy constituents from wax-bearing oils by which it is possible to secure marked operating advantages. In accordance with our invention, the dewaxing solvent is segregated into a substantially anhydrous stream and into a wet stream. The anhydrous stream is chilled to the desired temperature by countercurrent heat exchange with the chilled dewaxed oil or by countercurrent heat exchange with the waxy constituents or both. This operation may be efficiently conducted since heat transfer rates are not impaired due to ice deposits occurring in the equipment. The chilled dry solvent is utilized as make-up solvent for the respective chillers. The chilled dry solvent likewise may be economically employed for washing the wax cake since the efficiencies of the spraying means, particularly nozzle type sprays, are not impaired due to ice plugging and the like. The wet solvent is handled to remove a large proportion of the water and returned and added to the feed oil without affecting the overall efficiency of the dewaxing operation in any manner whatsoever.

The process of our invention may be readily understood by reference to the attached drawing illustrating one modification of the same. A feed oil, which for the purposes of description is taken to be a wax-containing petroleum oil boiling in the lubricating oil range, is introduced into the dewaxing system by means of feed line 25 and waxy oil charge pump 1. The waxy oil is mixed with a suitable solvent, which for the purposes of illustration is taken to be liquefied propane. The solvent is withdrawn from propane storage vessel 20 by means of pump 21 and introduced into the dewaxing system by means of line 26. The mixture is passed under pressure through heater 2, cooler 3, and introduced into feed solution surge tank 4. The feed solution is withdrawn from tank 4 by means of line 27 and introduced into batch chillers 5 and 6. These chillers may comprise any desirable number of chilling units arranged and operated in any desirable manner. The solution is chilled in chillers 5 and 6 by vaporization of propane which is withdrawn from the respective chillers by means of line 33. In order to control the ratio of propane to oil, chilled make-up anhydrous propane is introduced into the respective chillers by means of line 34. The vaporized propane removed from chillers 5 and 6 is compressed by means of compressor 18 and passed to condenser 19. The chilled mixture containing the precipitated waxy constituents is preferably alternately withdrawn from chillers 5 and 6 by means of line 28 and introduced into filter feed drum 29. The chilled mixture is withdrawn from drum 29 by means of line 30, pump 9, and introduced into rotary drum or equivalent filter 7. The waxy constituents are separated from the oil and removed from filter 7 by means of line 31. The segregated waxy constituents are passed through heat exchanging means 60 and then passed to solvent recovery plant 61 by means of line 62 passing through heater 59. Solvent recovery plant 61 may comprise any desirable number of units arranged in any suitable manner. Operating conditions are adjusted to remove solvent-free wax by means of line 63 and solvent by means of line 64 which is compressed in compressor 65 and recycled to the system. Prior to removal of the waxy constituents from filter 7 the wax cake is washed with cold anhydrous propane introduced by means of line 32 and suitable spray type nozzles 50. The wash solvent may be withdrawn from filter 7 by means of line 67 through valve 66 and utilized as desired. The filtrate is withdrawn from rotary filter 7 by means of line 51 and passed into filtrate drum 8. Vaporous propane may be withdrawn by means of line 35, passed to the compressor 68 by means of a line not shown, and recycled to the system. The cold filtrate is withdrawn from filtrate drum 8 by means of pump 10, line 36, and passed through heat exchanger unit or units 11 in which the make-up propane and the propane employed for spraying the wax cake are chilled to the desired temperature. The partially warmed filtrate is passed through filtrate heater 12 and introduced into anhydrous propane separator 13. Anhydrous propane is removed overhead from propane separator 13 by means of line 37, condensed in condenser 14, and passed into dry propane receiver 15. This dry propane is withdrawn from dry propane receiver 15 by means of line 38 and pump 23, passed through heat exchanger means 11 and 66, and introduced as make-up propane and as wash propane to the chillers and filters respectively as described. The filtrate partially free of propane is withdrawn from propane separator 13 by means of line 39 and introduced into propane separator 16 in which the final traces of the propane are removed from the dewaxed oil. This is preferably accomplished by introducing open steam by means of line 40. Wet propane is withdrawn from propane separator 16 by means of line 41, compressed in compressor 68 and condensed in suitable condensing equipment 19 prior to being recycled with the fresh oil feed to the chillers. The majority of the added steam contained in propane vapors of line 41 is first preferentially condensed from these vapors by injecting water through line 47 into the vapors in contact chamber 44 and withdrawing the condensate through line 45 as bottoms. The dewaxed oil is withdrawn from separator 16 by means of line 42, pump 17, passed through heat exchanger means 43, and passed to dewaxed oil storage.

The process of the present invention may be widely modified. Any number of chillers arranged in any desirable manner may be employed. Similarly, a number of filters may be utilized. The essential features of the present invention comprise a novel process for the chilling and handling of solvent which may be economically and efficiently employed as make-up solvent and as wash solvent applied by spraying means such as by spray type nozzles. Preferred modifications of the present invention are the steps in which the wash liquid solvent is segregated from the filtrate and utilized as make-up solvent for the chillers. In accordance with this modification, the wash solvent is introduced into filter 7 by means of line 32 and withdrawn by means of line 52 and pump 55. This operation could readily be achieved by adjusting valves 53, 54 and 66. Another modification of the present process is to adjust the rate of return of the make-up solvent so that the liquid levels in the respective chillers are gradually lowered as the temperature of the waxy mixture decreases. The temperature of the make up solvent passed to the chillers by means of line 34 may be adjusted to correspond to the temperature in the chillers by means of cooling means 46.

The process may be readily employed for removing wax constituents from any wax-containing mineral oil. It is particularly applicable in the removal of waxy constituents from wax-bearing petroleum oils boiling in the lubricating oil range. The dewaxing solvent employed likewise may widely vary. The process, however, is especially applicable when the dewaxing solvent utilized is a liquefied normally gaseous hydrocarbon, such as ethane, propane, butane or mixtures of the same. The amount of the dewaxing solvent employed may likewise vary considerably. In general, when dewaxing a wax-containing lubricating oil fraction utilizing propane, it is preferred to employ from about 1 to 4 volumes of propane per volume of oil depending upon various factors such as wax content, quality of wax, and upon character of the feed oil. The chilling of the wax-containing oil may be secured in any desirable manner. In general, the amount of anhydrous make-up solvent added to the chillers should be substantially equivalent to the pounds of solvent vaporized in order to cool the waxy charge the desired degree. The chilling rate of the waxy oil should be adjusted so that a desirable wax crystalline structure is secured which will be readily filtrable. We have found that a critical minimum initial or a so-called warm dilution is necessary, as well as a critical final or filtering dilution. Since a reduction in temperature results in a contraction of the solvent, in order to secure the critical solvent to oil ratios the quantity of make-up solvent added will be controlled so that the liquid levels in the respective chillers will fall as the temperatures in the chillers decrease. For example, when dewaxing a waxy oil boiling in the lubricating oil range utilizing propane, it is preferred that the initial propane to oil ratio be in the range of about 2.0 to 3.0, preferably in the range of about 2.3 to 2.5 volumes of propane per volume of oil and that the filtering ratio be in the range of about 2.0 to 4, preferably in the range of about 2.0 to 3 volumes of propane per volume of oil as measured at 60° F. The make-up solvent is preferably added at a temperature substantially equivalent to the temperature of the chilled stock in the particular chiller, which is secured by countercurrently contacting the added make-up solvent with the vaporized solvent being withdrawn from the respective chillers. This may be secured by distributing and contacting means 46 maintained in the tops of the respective chillers. The added make-up solvent preferably comprises wash solvent utilized for washing the wax cake on the filter. By utilizing the wash solvent as make-up solvent for the chiller, considerable refrigeration costs are saved and it is not necessary to remove the added wash solvent from the dewaxed oil in the recovery equipment. Heat exchanging means 11 may comprise any number of heat exchanging units arranged in any desirable manner. The amount of anhydrous solvent removed from recovery unit 13 is sufficient to care for the make-up and wash solvent needs. In general, when employing propane as the solvent about 90% of the propane is removed from the filtrate in stage 13. The solvent should be substantially anhydrous and in no instance should have a moisture content above about 0.1%. The solvent should have a moisture content below about 0.01% and should preferably be anhydrous. Conditions are adjusted to remove the remaining solvent and to completely free the oil of solvent in a secondary stage 16. This may be readily accomplished by the use of open steam in the secondary stage. By removing the solvent in a process of this character which comprises an initial stage for the production of dry solvent which is countercurrently chilled by heat exchange with the dewaxed oil and recycled as make-up solvent to the chillers and as wash solvent in the filters and a secondary stage comprising preferably an open steam or equivalent operation, an overall improved dewaxing operation results which could not otherwise be secured.

In order to further illustrate the invention, the following example is given which should not be construed as limiting the same in any manner whatsoever:

*Example*

The waxy constituents of a waxy feed oil are precipitated when the waxy charge stock is mixed with 2.8 volumes of propane, heated to a temperature of about 150° F., cooled in a cooler to about 120° F. and then chilled at an average rate of about 3.5° F. per minute in a chilling stage to a temperature of about —45° F. by vaporization of propane. Due to ice plugging of the spray nozzles, difficulties are encountered when the chilled stock containing the precipitated waxy constituents is introduced into a rotary filter in which the wax cake is washed with propane in order to remove occluded oil from the wax cake. When operating in a maner not adapted for segregation of an anhydrous propane stream it is found that it is very difficult to secure a satisfactory operation either on the heat exchanging equipment for the cooling of propane or on the spray nozzles since ice plugging occurred, decreasing the efficiency of the heat exchanging equipment and of the spray nozzles. When operating in the manner described with respect to the present process in which sufficient dry propane is first segregated, it is possible to carry out these operations for indefinite periods.

The process of the present invention is not to be limited by any theory or mode of operation, but only in and by the following claims in which it is desired to claim all novelty in so far as the prior art permits.

We claim:

1. A process for the continuous removal of waxy constituents from a wax-containing feed oil comprising adding a dewaxing solvent to the feed oil, chilling the feed to dewaxing temperatures by vaporization of the solvent in a chilling zone, separating the precipitated waxy constituents from the chilled dewaxed oil in a filtering zone, washing the separated waxy constituents in said filtering zone by spraying the same with chilled anhydrous solvent, separately removing the chilled dewaxed oil and the waxy constituents from said filtering zone, treating said oil in an initial stage to separate therefrom anhydrous solvent, treating the oil in a secondary stage utilizing steam to completely remove said solvent, chilling said anhydrous solvent by heat exchange with said chilled dewaxed oil after removal of the oil from the filtering zone, and recycling the same after separation to the separated waxy constituents, introducing said solvent removed from said secondary zone into the feed oil at a point before substantial cooling of the feed oil is attained.

2. A process in accordance with claim 1 in which said dewaxing solvent is a liquefied normally gaseous hydrocarbon.

3. A process in accordance with claim 1 in which said dewaxing solvent comprises propane.

4. A process in accordance with claim 1 in which said anhydrous solvent is recycled to the chilling zone as make-up solvent at a temperature substantially equivalent to the temperature prevailing in said zone.

5. A process for the removal of waxy constituents from a wax-bearing petroleum oil comprising adding a dewaxing solvent to said petroleum oil, chilling the same to dewaxing temperatures by vaporization of the solvent in a chilling zone, removing the chilled mixture from said zone and separating the waxy constituents from the oil in a filtering zone in a manner in which the waxy constituents are washed by means of spray nozzles with chilled anhydrous solvent prior to the removal of the waxy constituents from the filtering zone, separately removing the chilled dewaxed oil from the filtering zone and the washed waxy constituents from the filter, treating the chilled dewaxed oil in an initial stage to separate therefrom anhydrous solvent, treating said oil in a secondary stage utilizing steam to completely remove said solvent, chilling said anhydrous solvent by heat exchange with said chilled dewaxed oil, and recycling the same to the dewaxing system at a point at which the temperature is substantially below the temperature of the feed oil, introducing the solvent removed from said secondary stage into said oil at a point before substantial cooling of the feed oil is attained.

6. A process in accordance with claim 5 in which the said solvent is a liquefied normally gaseous hydrocarbon.

7. A process in accordance with claim 5 in which said chilled anhydrous solvent is recycled to the chilling zone as make-up solvent and as wash solvent to said spray nozzles in said filtering zone.

8. A process in accordance with claim 5 in which said chilled anhydrous solvent is returned to said chilling zone in a controlled amount so that the liquid level in said chilling zone drops as the temperature in said chilling zone decreases.

9. A process in accordance with claim 5 in which said chilled anhydrous solvent is returned to said filtering zone as wash solvent for said wax cake, is segregated and utilized as make-up solvent for said chilling zone.

10. A process as in claim 1 in which said anhydrous solvent is chilled by heat exchange with said chilled dewaxed oil and said precipitated waxy constituents after removal of the respective streams from said filtering zone.

11. A process as in claim 5 in which said anhydrous solvent removed from said initial stage is chilled by heat exchange with said chilled dewaxed oil and said waxy constituents after removal of the respective streams from said filtering zone.

JOHN W. PACKIE.
JOHN D. LONG.
PAUL W. CORNELL.